(12) United States Patent
Jahanbin et al.

(10) Patent No.: US 8,457,414 B2
(45) Date of Patent: Jun. 4, 2013

(54) DETECTION OF TEXTURAL DEFECTS USING A ONE CLASS SUPPORT VECTOR MACHINE

(75) Inventors: Sina Jahanbin, Austin, TX (US); Alan C. Bovik, Austin, TX (US); Eduardo Perez, Cedar Park, TX (US); Dinesh Nair, Austin, TX (US)

(73) Assignees: National Instruments Corporation, Austin, TX (US); Board of Regents of the University of Texas System, Austin, TX (US)

( * ) Notice: Subject to any disclaimer, the term of this patent is extended or adjusted under 35 U.S.C. 154(b) by 805 days.

(21) Appl. No.: 12/632,389

(22) Filed: Dec. 7, 2009

(65) Prior Publication Data

US 2011/0026804 A1 Feb. 3, 2011

Related U.S. Application Data

(60) Provisional application No. 61/230,860, filed on Aug. 3, 2009.

(51) Int. Cl.
*G06T 9/62* (2006.01)

(52) U.S. Cl.
USPC .......................................................... 382/224

(58) Field of Classification Search
None
See application file for complete search history.

(56) References Cited

U.S. PATENT DOCUMENTS

| | | | |
|---|---|---|---|
| 7,194,134 B2 | 3/2007 | Bradshaw | |
| 7,359,555 B2 | 4/2008 | Porikli et al. | |
| 7,458,936 B2 | 12/2008 | Zhou et al. | |
| 7,555,155 B2 | 6/2009 | Levenson et al. | |
| 7,657,089 B2 | 2/2010 | Li et al. | |
| 7,711,174 B2 | 5/2010 | Sammak et al. | |
| 7,885,470 B2 | 2/2011 | Shi et al. | |
| 7,907,769 B2 | 3/2011 | Sammak et al. | |
| 2004/0151364 A1* | 8/2004 | Kenneway et al. | 382/152 |
| 2006/0210141 A1 | 9/2006 | Kojitani et al. | |
| 2008/0253625 A1 | 10/2008 | Schuckers et al. | |
| 2009/0074259 A1* | 3/2009 | Baltatu et al. | 382/118 |
| 2010/0046816 A1 | 2/2010 | Igual-Munoz et al. | |
| 2010/0098306 A1 | 4/2010 | Madabhushi et al. | |
| 2010/0266179 A1 | 10/2010 | Ramsay et al. | |

OTHER PUBLICATIONS

Dimitrios A. Karras, "Robust Defect Detection Using Improved Higher Order Wavelet Descriptors and Support Vector Machines for Visual Inspection Systems", IEEE publication, Apr. 2006, pp. 180-185.*

(Continued)

*Primary Examiner* — Brian P Werner
(74) *Attorney, Agent, or Firm* — Meyertons Hood Kivlin Kowert & Goetzel, P.C.; Jeffrey C. Hood

(57) ABSTRACT

Method for detecting textural defects in an image. The image, which may have an irregular visual texture, may be received. The image may be decomposed into a plurality of subbands. The image may be portioned into a plurality of partitions. A plurality of grey-level co-occurrence matrices (GLCMs) may be determined for each partition. A plurality of second-order statistical attributes may be extracted for each GLCM. A feature vector may be constructed for each partition, where the feature vector includes the second order statistical attributes for each GLCM for the partition. Each partition may be classified based on the feature vector for the respective partition. Classification of the partitions may utilize a one-class support vector machine, and may determine if a defect is present in the image.

26 Claims, 11 Drawing Sheets

OTHER PUBLICATIONS

Unser, M., "Texture Classification and Segmentation Using Wavelet Frames," IEEE Transactions on Image Processing, vol. 4, No. 11, Nov. 1995, 1549-1560.

A. Latif-Amet, A. Ertuzun, A. Ercil, "An Efficient Method for Texture Defect Detection: Subband Domain Co-ccurrence Matrices," Image and Vision Computing, vol. 18, Issues 6-7, May 2000, 29 pages.

Murino, V., Bicego, M., Rossi, I.A., "Statistical classification of raw textile defects," Proceedings of the 17th International Conference on Pattern Recognition (ICPR'04), 2004, 4 pages.

Zhen Hou and Johne M. Parker, "Texture Defect Detection Using Support Vector Machines with Adaptive Gabor Wavelet Features," Proceedings of the Seventh IEEE Workshop on Applications of Computer Vision (WACV/Motion'05), 2005, 6 pages.

Shutao Li, James T. Kwok, Hailong Zhu, Yaonan Wang, "Texture Classification using the Support Vector Machines," Pattern Recognition, vol. 36, Issue 12, Dec. 2003, 19 pages.

Julesz, B., Gilbert, E., Shepp, L., and Frisch, H., "Inability of humans to discriminate between visual textures that agree in second-order statistics—revisited" Perception 2(4) 391-405, 1973.

\* cited by examiner

DETECTION OF TEXTURAL DEFECTS USING A ONE CLASS SUPPORT VECTOR MACHINE

PRIORITY CLAIM

This application claims benefit of priority to provisional Application No. 61/230,860, filed Aug. 3, 2009, titled "Detection of Textural Defects Using a One Class Support Vector Machine, whose inventors are Sina Jahanbin, Alan C. Bovik, Eduardo Perez, and Dinesh Nair, which is hereby incorporated by reference in its entirety as though fully and completely set forth herein.

FIELD OF THE INVENTION

The present invention relates to image analysis, and more particularly to a system and method for detecting defects in textural images using a one class support vector machine.

DESCRIPTION OF THE RELATED ART

Automatic visual inspection (AVI) is an important application of computer vision (also revered to as "machine vision") that plays an important role in quality control of manufactured products and many other fields. AVI systems attempt to find functional or cosmetic defects by observing visual data from the products to be inspected. Machine inspection systems are inherently more consistent than human inspectors because they are not vulnerable to emotional, physical, and environmental distractions. Currently, a wide variety of industries are saving significant amounts of money and manpower by relying on machine vision solutions to control the quality of their products. For example, automatic or semi-automatic visual inspection systems have been developed for products such as printed circuit boards (PCBs), automotive parts, and labels on product packages. Typically, such automatic visual inspection systems rely on fixed templates or patterns in captured images to determine whether any defects are present.

Products which have natural or apparently naturally textured surfaces, e.g., which do not have regular patterns or templates which can be used in an inspection algorithm, present a significantly more difficult problem. For example, the visual appearances of products such as tiles, textiles, leather, and lumber cannot be described by regular textures. In addition, in some cases it may not be possible to describe images of other natural or organic textures (such as biomedical images) with regular and/or patterned textures. Accordingly, pattern- and template-based visual inspection systems are not appropriate for inspecting these types of surfaces and/or images. Although a number of textural analysis techniques have been developed, none have yet proved suitable for implementation in an automatic visual inspection system for detecting defects in textured surfaces, and inspection of products with textured surfaces is still typically performed by trained human inspectors. Thus, improvements in techniques for detecting defects in textured surfaces are desirable.

SUMMARY OF THE INVENTION

Embodiments are presented of a system and method for detecting visual textural defects. The system and method are primarily described herein as they may relate to visual inspection of a surface of a product, e.g., a product which has been manufactured, produced, and/or processed in one or more ways. However, it will be readily apparent that the system and method described herein may be applicable to any visual inspection of images with textured appearances; for example, the system and method may be applicable to analysis of biological or biomedical images, images of terrain, or any number of other types of textured images.

The method may be implemented as a visual inspection system, e.g., including an input for receiving images, a processor coupled to the input, and a memory medium storing program instructions executable by the processor to implement the method. Alternatively, the method may be implemented simply as a computer readable memory medium storing program instructions executable to implement the method. The method may operate as follows.

An image of a surface of a product may be received. The surface may have an irregular visual texture; accordingly, the image may be an image of the irregular visual texture of the surface of the product. In some embodiments, the image may have a stochastic intensity distribution.

The image may be decomposed into a plurality of subbands. Each of the subbands may correspond to a different resolution and/or orientation; for example, in one embodiment there may be subbands corresponding to horizontal, vertical, and diagonal orientations, at both a more-detailed and a coarser resolution. Decomposing the image may include using biorthogonal wavelets.

The image may be partitioned into a plurality of partitions. The partitions may be overlapping or non-overlapping, according to various embodiments. In some embodiments, partitioning the image may include partitioning each subband image into a plurality of partitions; thus, each partition may correspond to a subset of the overall image for each subband of the image.

A grey-level co-occurrence matrix may be determined for each partition. Each grey-level co-occurrence matrix for a given partition may correspond to a particular subband of that partition. Each grey-level co-occurrence matrix for a particular partition and subband may be direction independent; for example, each matrix may be an average of a plurality of direction dependent matrices.

A plurality of second-order statistical attributes may be extracted for each grey-level co-occurrence matrix. The second-order statistical attributes may be Haralick features, e.g., entropy, dissimilarity, contrast, homogeneity, and correlation.

A feature vector may be constructed for each partition. A feature vector for a given partition may include the plurality of second-order statistical attributes extracted for each greylevel co-occurrence matrix (e.g., for each subband) for that partition.

The image (e.g., each partition in the image) may be classified based its feature vector(s). Classifying the image may include utilizing a one-class support vector machine to determine if a defect is present on the surface of the product. The one-class support vector machine may be trained using only defect-free samples. If a defect is present on the surface of the product, classifying each partition may also determine a location of the defect.

The entire method as described above may be performed substantially in real-time. In other words, receiving, decomposing, and partitioning the image, determining grey-level co-occurrence matrices, extracting second-order statistical attributes, constructing feature vectors, and classifying the image (including classifying each partition of the image) may be performed within a relatively small amount of time. For example, if the method is being implemented in a manufacturing setting, e.g., if the products to be inspected are moving along a conveyor belt as images of them are captured, the method may be performed for a product in less than the amount of time between receiving an image of the surface of the product and receiving an image of the surface of the next product to be inspected.

BRIEF DESCRIPTION OF THE DRAWINGS

A better understanding of the present invention can be obtained when the following detailed description of the preferred embodiment is considered in conjunction with the following drawings, in which.

Figure 1:
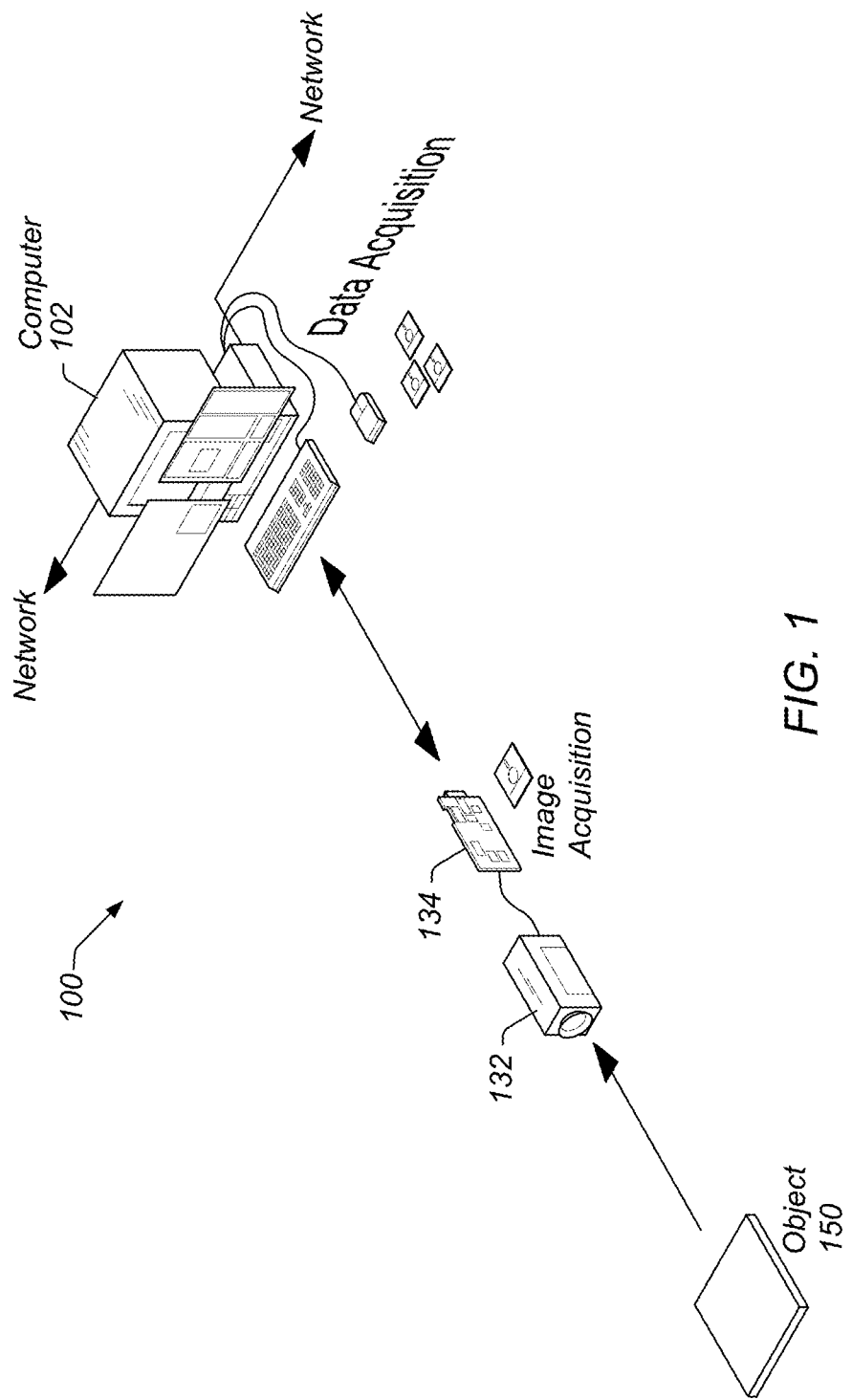
FIG. 1 illustrates a representative machine vision system interfacing with a product.

While the invention is susceptible to various modifications and alternative forms specific embodiments are shown by way of example in the drawings and are herein described in detail. It should be understood however, that drawings and detailed description thereto are not intended to limit the invention to the particular form disclosed, but on the contrary the invention is to cover all modifications, equivalents and alternative following within the spirit and scope of the present invention as defined by the appended claims.

DETAILED DESCRIPTION OF THE EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

FIG. 1—Machine Vision System

FIG. 1 illustrates an exemplary system which may be used to execute a machine vision system or process. Embodiments of the invention may of course also be used by other types of systems as desired. The system 100 comprises a host computer 102 which may connect to a machine vision or image acquisition card 134, which in turn may couple to a camera 132. Thus the video device or camera 132 may be coupled to the computer 102 via the image acquisition card 134 provided by the computer 102.

The image acquisition card 134 may be typically plugged in to an I/O slot in the computer 102, such as a PCI bus slot, a PC Card slot, a PCI Express bus slot, etc. provided by the computer 102. However, this card 134 is shown external to computer 102 for illustrative purposes.

The host computer 102 may comprise a CPU, a display screen, memory, and one or more input devices such as a mouse or keyboard as shown. The camera 132 may operate to capture images of (e.g., to inspect) an object (e.g., a product) 150. The host computer 102 may store computer programs or components to control and execute the machine vision process. It is noted that the host computer 102 is exemplary, and various types of processing systems may be used, as desired.

Figure 2:
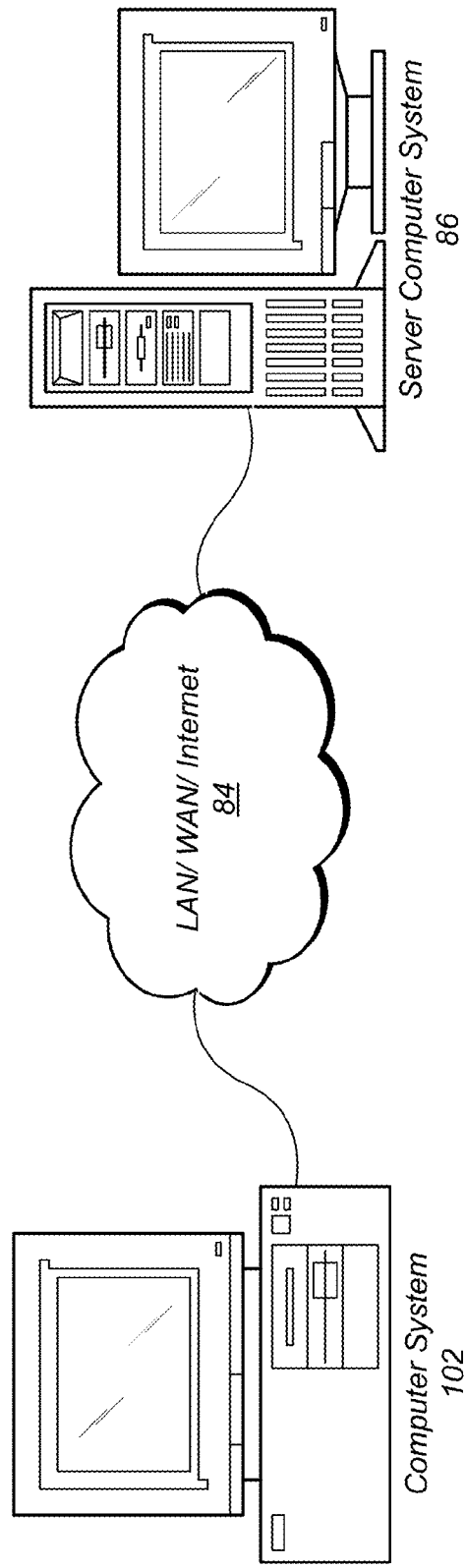
FIG. 2 illustrates a computer system connected through a network to a second computer system.

Referring again to FIG. 1, the computer system 102 preferably includes a memory medium on which one or more computer programs or software components according to the present invention are stored. In addition, the memory medium may be located in a first computer in which the programs are executed, or may be located in a second different computer which connects to the first computer over a network, such as a LAN (local area network), WAN (wide area network), or the Internet, as shown in FIG. 2, e.g., computer 102 coupled to a server computer 86. In the latter instance, the second computer 86 provides the program instructions to the first computer 102 for execution.

The system and method are primarily described herein as they may relate to visual inspection of a surface of a product (e.g., object 150) which may, according to various embodiments, have been manufactured, produced, and/or processed in one or more ways. However, it will be readily apparent that the system and method described herein may be applicable to any visual inspection of images with textured appearances;

for example, the system and method may be applicable to analysis of biological or biomedical images, images of terrain, or any number of other types of textured images.

Figure 3:
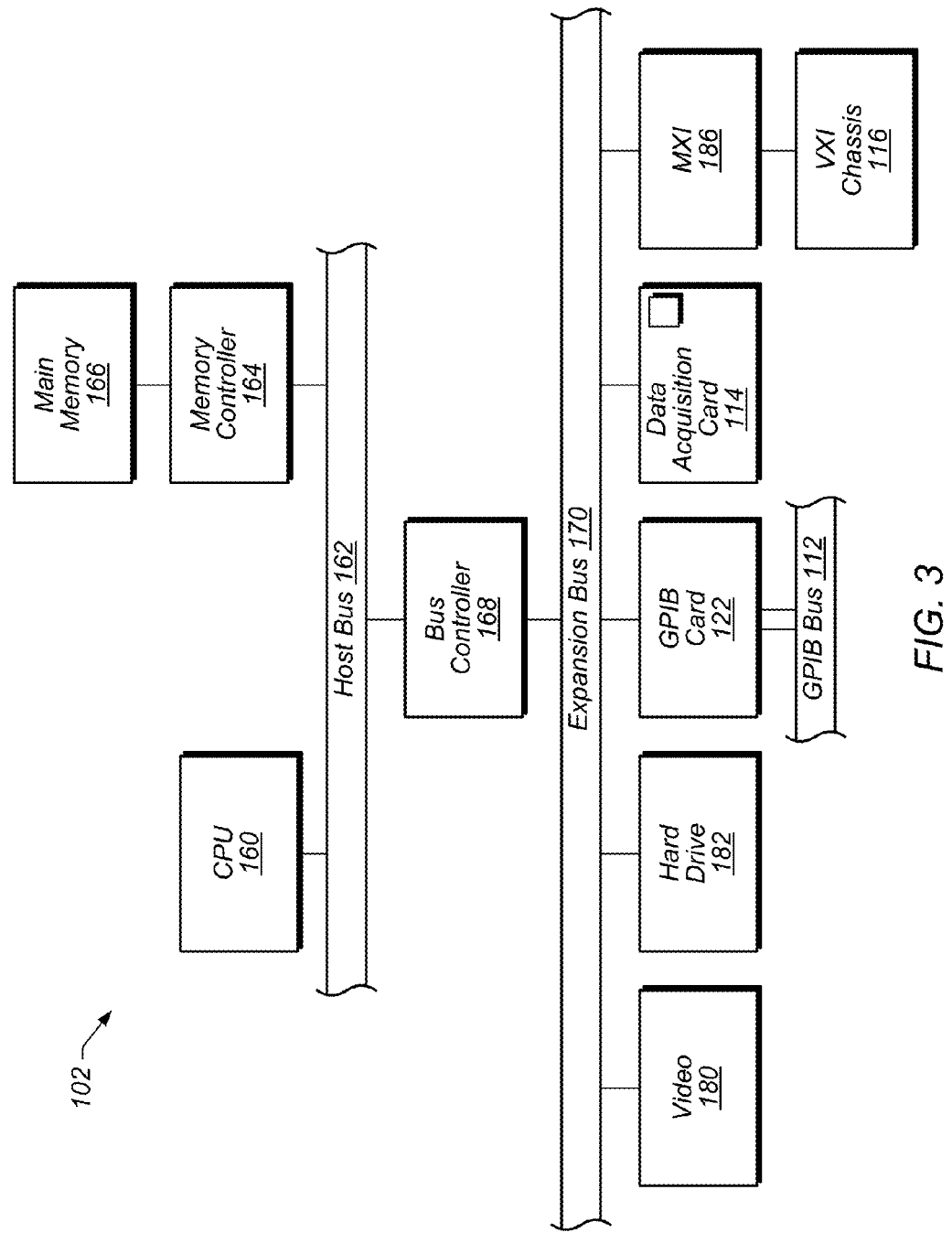
FIG. 3 is an exemplary block diagram of the computer system of FIGS. 1 and 2.

FIG. 3—Computer System Block Diagram

FIG. 3 is a block diagram of the computer system illustrated in FIGS. 1 and 2. It is noted that any type of computer system configuration or architecture can be used as desired, and FIG. 3 illustrates a representative PC embodiment. It is also noted that the computer system may be a general purpose computer system as shown in FIG. 1, a computer implemented on a VXI card installed in a VXI chassis, a computer implemented on a PXI card installed in a PXI chassis, an embedded system, or other types of embodiments. The elements of a computer not necessary to understand the present invention have been omitted for simplicity.

The computer 102 may include at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 may store computer programs according to embodiments of the present invention. The main memory 166 may also store operating system software as well as other software for operation of the computer system, as well known to those skilled in the art. The computer programs which implement embodiments of the present invention will be discussed in more detail below. Additionally, or alternatively, the main computer may include other processing elements/systems. For example, the computer may include one or more programmable hardware elements, e.g., including a field programmable gate array (FPGA) and/or include DSP capabilities.

The host bus 162 is coupled to an expansion or input/output bus 170 by means of a bus controller 168 or bus bridge logic. The expansion bus 170 may be a PCI (Peripheral Component Interconnect) expansion bus, or any other type of bus. The expansion bus 170 includes slots for various devices such as the data acquisition board 114 (of FIG. 1), a GPIB interface card 122 which provides a GPIB bus 112 for interfacing to a GPIB instrument, and a VXI or MXI bus card 186 coupled to the VXI chassis 116 for receiving VXI instruments. The computer 102 may further comprise a video display subsystem 180 and hard drive 182 coupled to the expansion bus 170.

Figure 4:
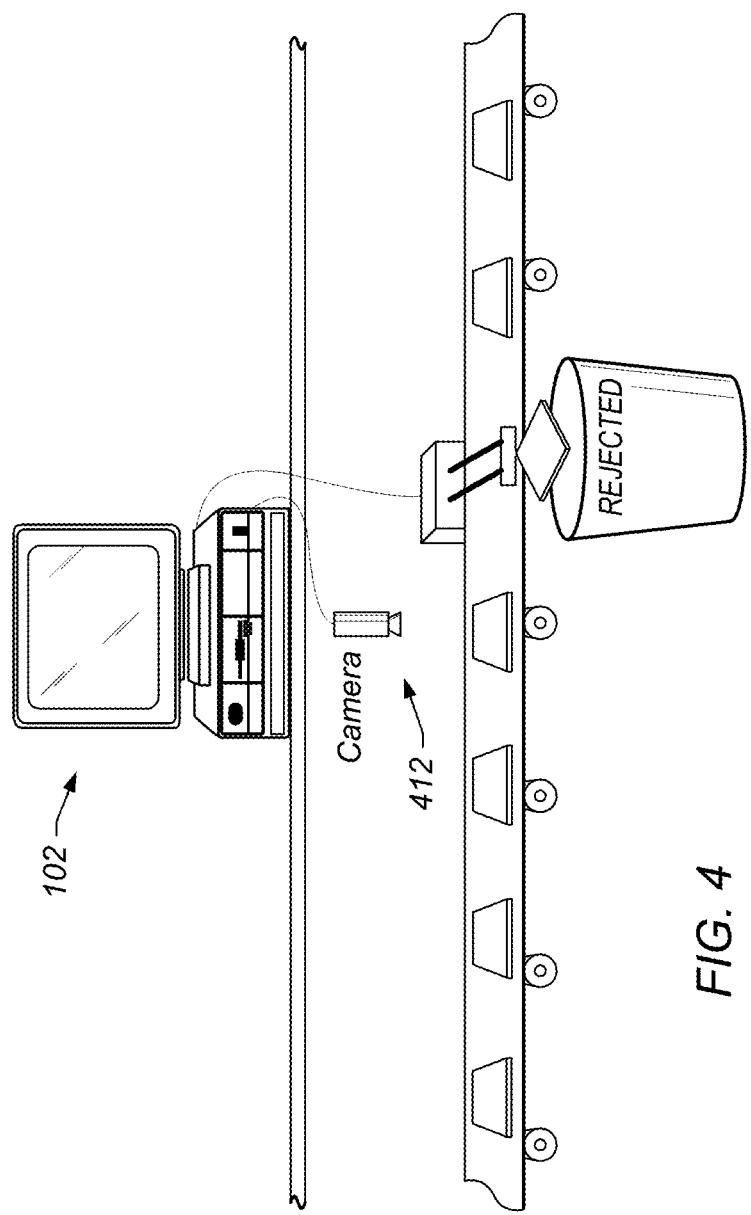
FIG. 4 illustrates a system for implementing an automatic inspection routine, according to one embodiment.

FIG. 4—System for Implementing an Automatic Inspection Routine

FIG. 4 illustrates one embodiment of a machine vision system. As FIG. 4 shows, the exemplary machine vision system may include a host computer 102 and a video source 412. The video source 412 may produce an analog or digital video signal that may include a sequence of video frames, or other data desired to be acquired. The analog or digital video signal may be provided to the host computer 102 for storage and/or processing.

In machine vision systems such as that shown in FIG. 4, a common task may be to inspect an object on an assembly line. This task may include acquiring an image of the object and then performing some machine vision (image) processing on the acquired image to determine characteristics of the object. For example, the object might be inspected for surface defects based on the image of the object. In a specific embodiment, the object may have an irregularly textured surface, such as a natural or natural appearing texture. For example, a machine vision system may be deployed in a manufacturing plant to inspect textured tiles for quality control. The system may specifically look for any defects on the surface of the tiles, such as scratches, stains, cracks, discolorations, and other flaws.

Machine vision systems such as those described above may be required to process the image data in or near real-time. For example, in an assembly line or other production setting, in order for an automatic visual inspection system to be useful, it may need to operate at or near the speed of production. Thus, in some settings, machine vision system such as shown in FIG. 4 may be configured to acquire, inspect, and approve or reject an image of a product (e.g., a product surface) within a minute, a few seconds, or even more quickly.

In some embodiments, the image may be acquired from a video source, such as camera 412, or from some other sources, such as a storage device or external systems, e.g., coupled to the machine vision system via a network as indicated by FIG. 2. In some embodiments, the video source may acquire images from objects traveling along a conveyer belt as in the system of FIG. 4. In some embodiments, the machine vision system may assign a pass or fail to an object on the conveyer belt, and objects that fail may be marked for rejection or disposed of in an automatic manner, as indicated in FIG. 4.

Figure 5:
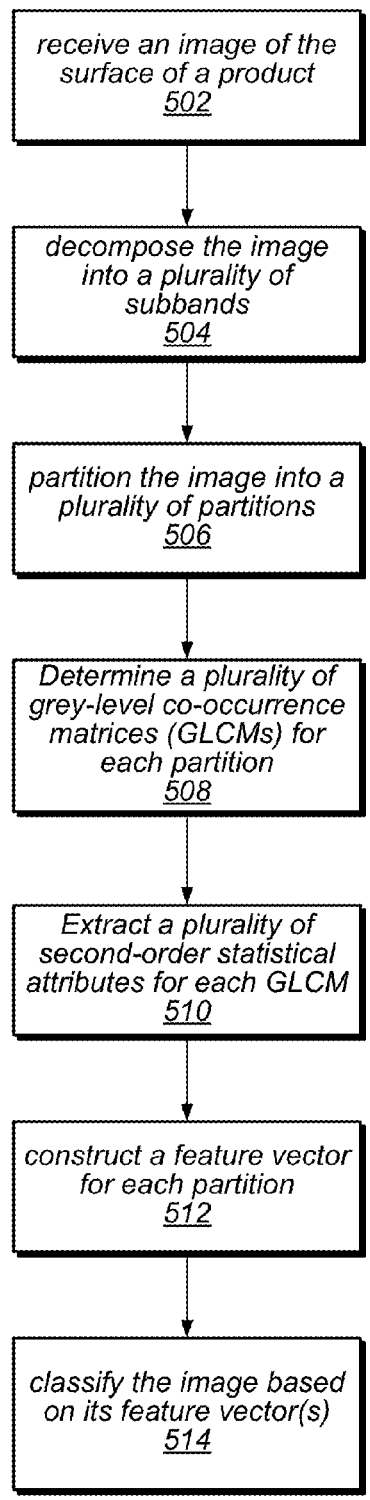
FIG. 5 is a flowchart diagram illustrating a method for detecting defects in a textured surface according to one embodiment.

FIG. 5—Method for Detecting Textural Defects on the Surface of a Product

FIG. 5 is a flowchart diagram illustrating a method for detecting textural defects on the surface of a product. The method shown in FIG. 5 may be used in conjunction with any of the systems, devices, and/or methods shown in and described with respect to the above Figures. In one embodiment, the method shown in FIG. 5 and described below may be implemented in an automatic visual inspection system for inspecting objects for defects. For example, the automatic visual inspection system could include an input for receiving images, a processor coupled to the input, and a memory medium coupled to the processor. The memory medium could store program instructions executable by the processor to implement the method described below. Such an automatic visual inspection system could be coupled to a camera for acquiring images of products to be inspected. According to various embodiments, such an automatic inspection system could be a general use computer system, a stand-alone unit, implemented as part of a camera or video camera (e.g., a smart camera), or in any other way as desired.

In various embodiments, some of the method elements shown may be performed concurrently, performed in a different order than shown, or omitted. Additional method elements may also be performed as desired. As shown, this method may operate as follows.

In 502, an image of the surface of a product may be received. The surface of the product may have an irregular visual texture; for example, the surface may be physically rough or textured in an irregular fashion, and thus may have an irregular textural appearance. Alternatively, the product surface may be smooth, and simply appear textured. In either case, the surface may not have any regular patterns suitable for pattern matching or template matching based inspection. The received image of the surface of the product may accordingly be an image of the irregular visual texture of the surface of the product. It should be noted, however, that though the method described herein may be optimally suited to defect detection with respect to irregularly textured objects, it may also suitable for objects with regular textures, patterns, and/or templates in some embodiments.

In 504, the image may be decomposed into a plurality of subbands corresponding to different directions and/or resolutions. A multiresolution analysis such as this may be particularly useful in imitating the multi-scale manner in which humans perceive images. One way of decomposing the image into such subbands is to use wavelet transforms, or alternatively, wavelet frame transforms. In a preferred embodiment, the image may be decomposed using discrete wavelet frame transforms (DWFT). DWFT have the advantage of providing translation-invariant characteristics from textures, with minimum dependencies between the transform coefficients. Additionally, because wavelet frames do not involve subsampling the output of the filter banks, each subband image has the same size as the input image; for this reason, DWFT may perform better than discrete wavelet transforms (DWT) in texture classification and segmentation.

In a preferred embodiment, the image may be decomposed using DWFT into four subbands: a coarser approximation (A), and horizontal (H), vertical (V), and diagonal (D) details. Additionally, a further decomposition may be performed, decomposing the approximation into four additional subbands: a further approximation (AA), and horizontal (AH), vertical (AV), and diagonal (AD) details of the first approximation. Thus, the decomposition may be a two-step decomposition. Although such a two-step decomposition produces eight subbands, in some embodiments, only a subset of those subbands may be used in subsequent steps. For example, in one embodiment, the pure approximations A and AA may not be used in subsequent steps, but only the H, V, D, AH, AV, and AD subbands. A more technical description of the general features of wavelet transforms is provided below with respect to FIGS. 6A and 6B.

In 506, the image may be partitioned into a plurality of partitions. In order to calculate grey-level co-occurrence matrices (as described below) for the image, it may be desirable to partition the image into smaller windows. Partitioning the image may also allow for a more detailed inspection; for example, if a defect in the image is found (e.g., in a subsequent step), the defect may be identified by the partition (or partitions) in which it is found, potentially providing more information on the location of the defect. In one embodiment, the image (e.g., a 640×480 pixel image, or any sized image) may be partitioned into a plurality of non-overlapping 15×15 pixel square windows (partitions). More particularly, in a preferred embodiment, each subband of the image may be partitioned into non-overlapping 15×15 square windows. It should of course be noted that other partition sizes are also possible; additionally, in some embodiments the image may not be partitioned, but may instead be analyzed in subsequent steps as a single image. It will thus be apparent that while the following steps refer primarily to various operations being performed on each partition, such operations may alternatively be performed on an unpartitioned image in some embodiments.

In 508, a plurality of grey-level co-occurrence matrices (GLCMs) may be determined for each partition. More specifically, a GLCM may be determined for each partition, for each of the plurality of subbands. For example, in one embodiment, the image subbands H, V, D, AH, AV, and AD may be used. Thus, for each partition of the image, a GLCM may be determined (e.g., calculated) for the H, V, D, AH, AV, and AD subbands of that respective partition.

It may be important that the GLCM for each partition/subband combination be directionally independent. For this reason, each GLCM may be an averaged GLCM, where the average is over a plurality (e.g., 4, or 8) directional displacement vectors. A further discussion of GLCM calculation, including additional technical details, is provided with respect to FIGS. 8 and 9.

In 510, a plurality of second-order statistical attributes may be extracted for each GLCM. According to Julesz et al. (Julesz, B., Gilbert, E., Shepp, L., and Frisch, H., "Inability of humans to discriminate between visual textures that agree in second-order statistics—revisited" *Perception* 2(4) 391-405, which is hereby incorporated by reference in its entirety as though fully and completely set forth herein), the human eye cannot make preattentive discrimination between textures that have identical first and second order statistics. Thus, in designing an automatic inspection system for inspecting textures, it would be desirable to utilize second order statistics.

One set of texture-oriented second order statistical features are those known as Haralick features. These features can be extracted from the GLCMs calculated for each partition in step 508, as described above. The Haralick features are known in the art as entropy, dissimilarity, contrast, homogeneity, and correlation. In a preferred embodiment, all five Haralick features may be extracted for each GLCM. Alternatively, other second order statistical attributes (instead of or in addition to the Haralick features) may be extracted from the GLCMs. Haralick features are described in further detail below with respect to FIG. 10.

In 512, a feature vector may be constructed for each partition. As previously described, a plurality of second order statistical attributes may have been extracted for each of a plurality of subbands for each partition. Thus, a partition may be represented by a feature vector including the extracted statistical attributes for each subband of the partition. For example, in a preferred embodiment, five Haralick features may be extracted from each of the six subbands H, V, D, AH, AV, and AD, producing a 30-dimensional feature vector. In addition, according to one embodiment, statistical features may also be extracted from smoothed and edge enhanced versions of each subband. For example, in a preferred embodiment, this would provide an additional 30 dimensions, for a 60 dimensional feature vector. As will be apparent to one of skill in the art, different numbers of subbands, different numbers of statistical features, and/or other modifications may be used to produce feature vectors of other dimensionalities, as desired.

In 514, the image may be classified based on its feature vector(s). In some embodiments, this may include classifying each partition of the image based on each partition's feature vector. For example, each partition may be classified as either normal or an outlier (e.g., containing at least one defect). In other words, the classification may determine if a defect is present on the surface of the product, and the location of the defect, by classifying each partition of the image of the surface of the product as either normal or defective. Defect detection, and particularly detection of defects in product inspection and quality control, may be an exemplary case of what is typically known as "outlier detection" or "one-class classification". In such cases, one of the classes (e.g., the normal class) is supported with numerous samples, while the other class (e.g., the defective/abnormal class) is represented by very few or no samples at all. For example, defects appearing on manufactured products with textured surfaces can be any of a vast combination of shapes, sizes, and orientations. Hence, even if it was feasible to collect all (or even a significant sample) of the possible defects, it could be an expensive undertaking involving damaging a significant number of products. Thus, a desirable solution would be to use a classifier that can learn a description of normality by only observing the predominant class, known as a "one-class classifier".

A simple one-class classifier typically utilizes distance-base decision rules, in which each partition would be classified based on a comparison of the distance from its feature vector to the average vector of normal samples with an empirically determined threshold. However, distance-base classifiers are generally not desirable because they do not provide a good generalization of the normal class, they are not suitable for high dimensional feature spaces, and the empirically adjusted threshold might be unacceptable. On the other hand, it has been found that a one-class support vector machine (SVM), which can learn and generalize normal texture based only on defect-free samples, may be among the best outlier detectors. Thus, in a preferred embodiment, classifying the image (e.g., classifying each partition in the image) may include using a one-class SVM which has been trained using only defect-free samples. A more technical description of the general features of support vector machines is provided below with respect to FIG. 11.

Figure 6A:
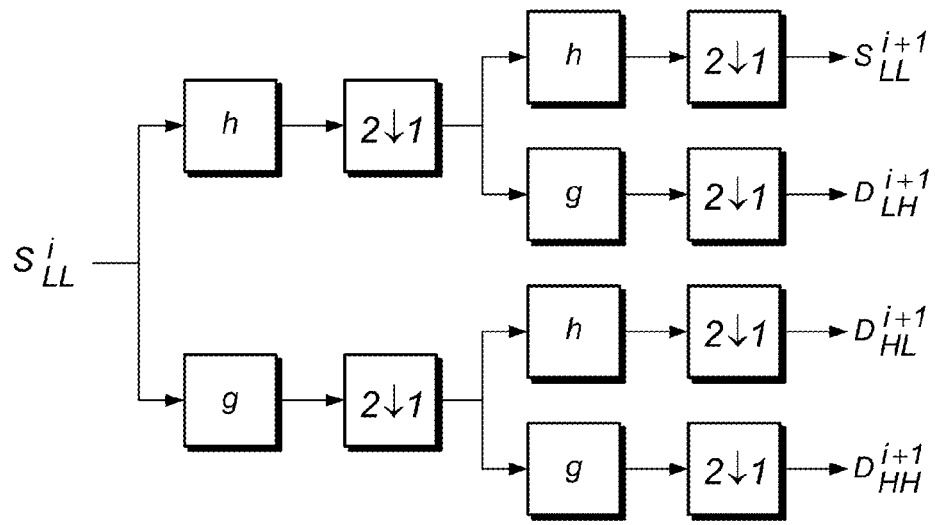
FIGS. 6A and 6B illustrate stages of a two-dimensional discrete wavelet transform and a two-dimensional discrete wavelet frame transform respectively.
Figure 6B:
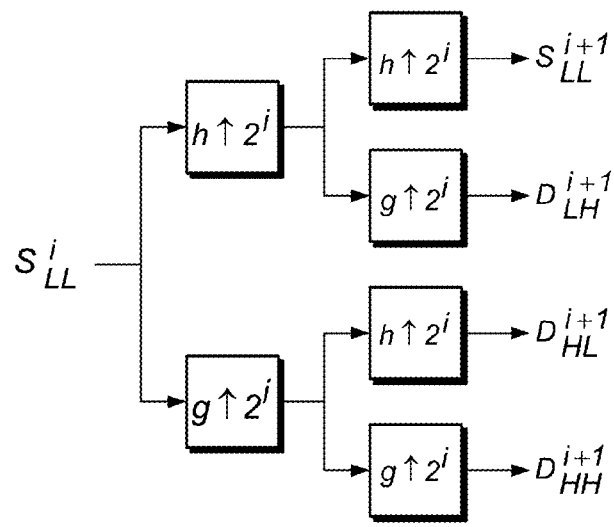

FIGS. 6A and 6B—Discrete Wavelet Transform

As described above, wavelet transforms may be used to decompose an image into subbands, in order to simulate the multi-scale/multi-resolution manner in which humans perceive images. For example, wavelet coefficients at finer scales may be appropriate for micro-texture modeling while wavelet coefficients at coarser scales may effectively capture macro-texture attributes.

Multi-resolution texture and image analysis applications commonly utilize traditional discrete wavelet transforms (DWT). For example, a hierarchical signal analysis/decomposition using DWT which could be used in the context of texture analysis can be implemented by iterative filtering and downsampling operations with analysis lowpass and highpass filters h and g. These filters and their corresponding reconstruction counterparts satisfy the general "perfect reconstruction" constraint $H(z)\overline{H}(z^{-1})+G(z)\tilde{G}(z^{-1})=1$ in the z-transform domain. At each iteration the coefficients of the coarser approximation, $s_{i+1}$, and the detail coefficients, $d_{i+1}$, are calculated from current coefficients, $s_i$, by:

$$\begin{cases} s_{i+1}(k) = [h * s_i(k)]_{\downarrow 2} \\ d_{i+1}(k) = [g * d_i(k)]_{\downarrow 2} \end{cases} (i = 0, \ldots, I) \quad (1)$$

where $s_0(k)=f(k)$ is the input signal to the filter bank. This concept may be extended to 2-D discrete signals (e.g., images); in this case the 2-D filters may be obtained from the tensor product of the 1-D lowpass and highpass filters h and g along the rows and columns. Thus, after such a decomposition, an image at resolution i may be decomposed into four subband images, as shown in FIG. 6A. These subband images may include a coarser approximation (A) ($s_{LL}^{i+1}$), and three detail images ($D_{LH}^{j+1}$, $D_{HL}^{j+1}$, and $D_{HH}^{j+1}$, also known as horizontal (HI), vertical (V), and diagonal (D) details). It will be noted, however, that in DFT, decomposition typically involves downsampling; for example, in FIG. 6A, $2\downarrow 1$ denotes downsampling by a factor of 2. This may be a significant problem with DWT, as it may result in undesirable intra-scale and inter-scale dependencies. Another drawback to DWT is that a simple integer shift in the input image may result in non-trivial changes in the wavelet coefficients; in other words, such a transform is translation-variant.

An alternative to DWT is a discrete wavelet frame transform (DWFT). Wavelet frames are variations of wavelet transforms in which the output of the filter banks are not subsampled. As a result, the each subband image has the same size as the input image. Additionally, DWFT may be used to obtain translation-invariant characteristics from textured images, with minimum dependencies between the transform coefficients. Thus, although DWT may also be suitable under some circumstances, DWFT may be a preferred way of decomposing an image into subbands in many embodiments.

Unser (Unser, M., "Texture classification and segmentation using wavelet frames" Image Processing, IEEE Transactions on 4(11), 1549-1560 (1995), which is hereby incorporated by reference in its entirety as through fully and completely set forth herein) teaches an overcomplete wavelet decomposition and shows that it constitutes a tight frame of $l_2$ and implements a fast iterative decomposition algorithm for it. This DWFT decomposition may be formulated as:

$$\begin{cases} s_{i+1}(k) = [h]_{\uparrow 2^i} * s_i(k) \\ d_{i+1}(k) = [g]_{\uparrow 2^i} * s_i(k) \end{cases} (i = 0, \ldots, I) \quad (2)$$

where $s_0(k)=f(k)$ is the input signal. FIG. 6B shows one stage of a 2-D DWFT where successive convolution along the rows and columns of the image is performed with the 1-D filters $[h]_{\uparrow 2}^i$ and $[g]_{\uparrow 2}^i$, which are the basic filters h and g expanded by insertion of an appropriate number of zeros ($2^i-1$) between taps. It will be noted that there is no dyadic subsampling in this implementation of DWFT and as a result, all of the decomposed subbands may be the same size as the original image.

As previously noted with respect to FIG. 5, in some embodiments the decomposition process may be a two-step decomposition process. In such a case, one of the decomposed subbands may be further decomposed by the same process to produce an additional set of subbands; for example, the subband A could be further decomposed into AA, AH, AV, and AD subbands.

In a preferred embodiment, biorthogonal wavelets may be used for the subband decomposition. In this case, the analysis filters h and g may be different from the synthesis filters $\bar{h}$ and $\tilde{q}$. Compared to orthogonal wavelets, biorthogonal wavelets may preserve linear phase more faithfully, may have finite impulse response, and can have higher regularity. However, orthogonal wavelets may also be used in some embodiments.

FIG. 7—Subbands

Figure 7:
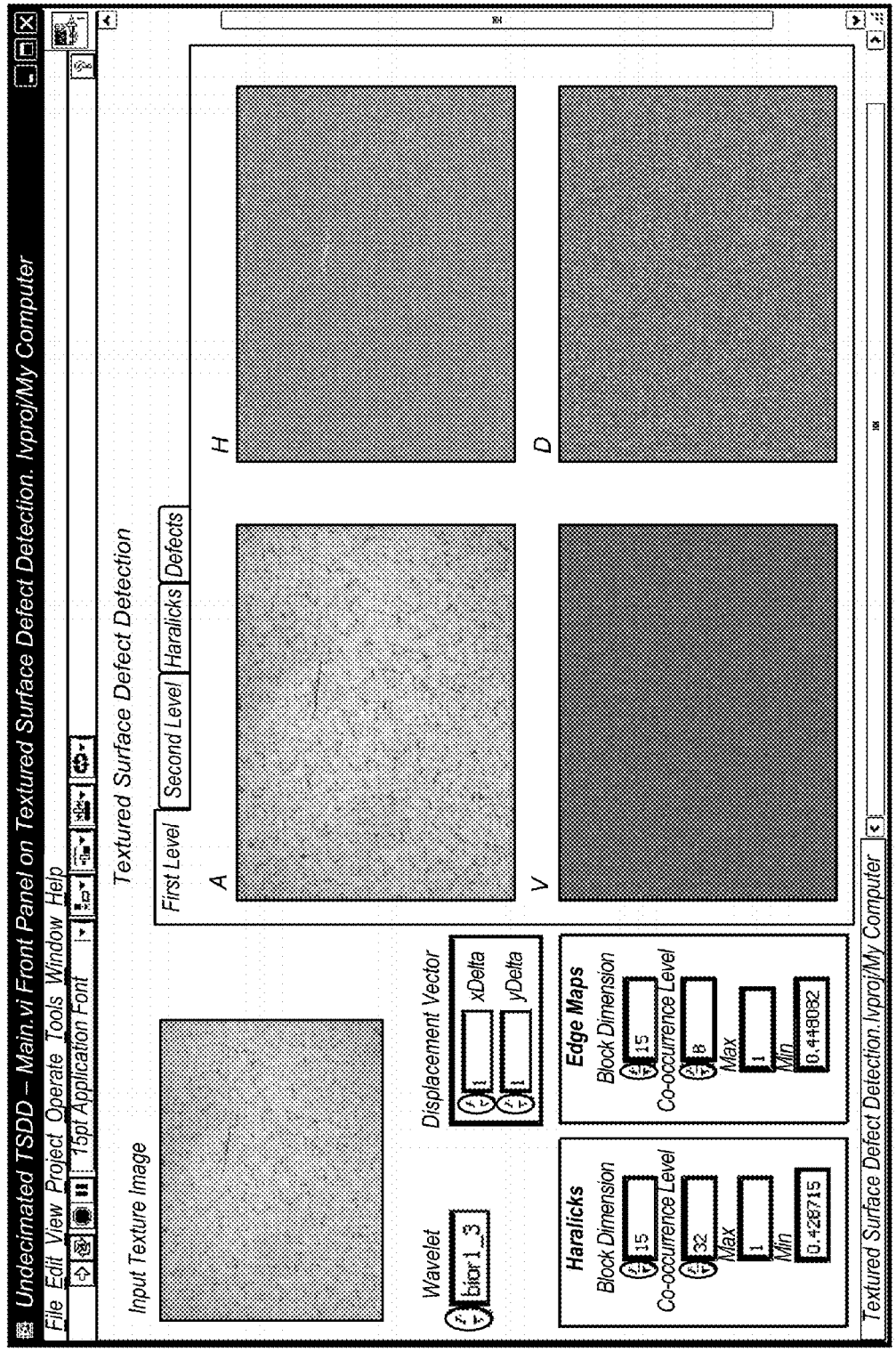
FIG. 7 illustrates several subbands of a textured image with a visible scratch according to one embodiment.

FIG. 7 illustrates several subbands of a textured image with a visible scratch according to one embodiment. The subbands in this case are those produced by one stage of decomposition; that is, the A, H, V, and D subbands. The input image is shown at left. It will be noted that of the detail subbands (H, V, and D), the visible scratch is remarkably secluded in the subband H.

Figure 8:
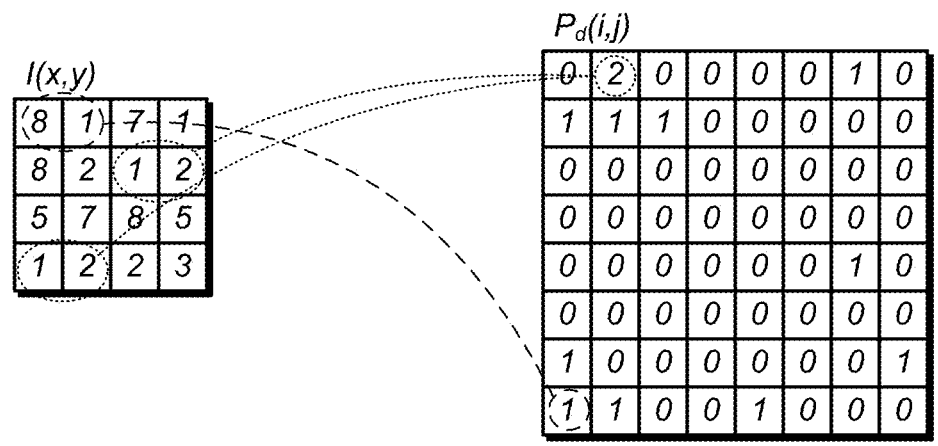
FIG. 8 illustrates an exemplary image with 8 grey levels and a corresponding grey-level co-occurrence matrix according to one embodiment.

FIG. 8—Grey-Level Co-Occurrence Matrix

The first step in calculating Haralick features (or in alternate embodiments, other second-order statistical attributes) from a texture image $I(x,y)$ may be to construct a grey-level co-occurrence matrix (GLCM) for the image. A GLCM basically estimates the joint probability that a pair of pixel values occur at a distance vector $\vec{d}$ from each other. If the texture image $I(x,y)$ is an N×M matrix consisting of G different grey shades, its GLCM for displacement $\vec{d}=(d_x,d_y)$ is a G×G matrix:

$$P_{\vec{d}}(i, j) = \sum_{x=1}^{N} \sum_{y=1}^{M} \delta\{I(x, y) = i \wedge I(x + d_x, y + d_y) = j\} \quad (3)$$

where $\delta\{\text{True}\}=1$ and $\delta\{\text{False}\}=0$. The number in the element (i,j) of the GLCM matrix, $P_{\vec{d}}(i,j)$, counts the number of times that the pixel with value i occurred $\vec{d}$ away from a pixel with the value j. FIG. 8 shows an example 4×4 image I(x,y) with 8 grey levels. The corresponding GLCM for displacement $\vec{d}=(0,1)$ is shown in FIG. 8 to be an 8×8 matrix P(i,j) representing how many times a pixel with grey level value i happens to be on the left hand side of a pixel with grey level value j. For example, pixels with value 1 are twice located to the left of pixels with value 2, and hence $P_{(0,1)}(1,2)=2$. Similarly, $P_{(0,1)}(8,1)=1$ because a pixel with a value of 8 is located to the left of a pixel with a value of 1 only once, in this example.

A GLCM may be calculated from an overall visual texture, (e.g., from an entire image, for example in classifying types of textures) or multiple GLCMs may be calculated for local features. In the case of defect detection, it may be desirable to determine GLCMs for local parts of an image, which may locate any detected defects more precisely than simply using GLCMs for an entire image. There are multiple ways to extract localized GLCMs from an image.

One way to produce localized GLCMs involves sliding a "window" of a certain size (e.g., a size smaller than the entire image) over the image, calculating a GLCM for that window, and associating it with the center pixel of that window. The window may then be slid to another portion of the image, another GLCM may be calculated, and the new GLCM may be associated with the new center pixel of the new image portion. This may be continued any number of times to produce a desired number of GLCMs. It will be noted that in this case, the windows may be overlapping.

Another way to produce localized GLCMs involves partitioning the image into a number of non-overlapping windows and calculating the GLCM for each partition. In both methods, the size of the window may be modified as desired in order to achieve the desired level of localization. For example, in one embodiment, 15×15 partitions may be used; however, other sized partitions are also suitable.

Figure 9:
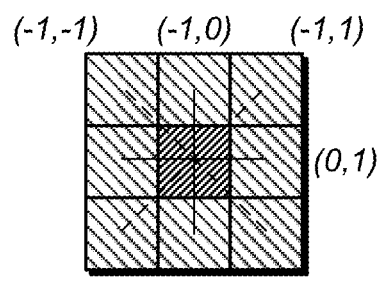
FIG. 9 illustrates eight directions over which a grey-level co-occurrence matrix may be calculated according to one embodiment.

FIG. 9—GLCM Directional Averaging

The displacement vector $\vec{d}$ is an important parameter in the calculation of a GLCM, because a constant visual texture results in a different GLCM for each displacement vector $\vec{d}$. Although in some embodiments a directionally dependent GLCM may be acceptable, it may instead be desirable to use a direction independent GLCM. One way to do this is to average a number of matrices which have been calculated using different displacement vectors. For example, four, six, eight, or any number of different matrices could be averaged. FIG. 9 shows eight directions, corresponding to displacement vectors (−1,−1), (−1,0), (−1,1), (0,1), (1,1), (1,0), (1,−1), and (0,−1). In a preferred embodiment, the GLCM from which second-order statistical features may be extracted for a given partition and subband may be a GLCM which is an average of the eight GLCMs corresponding to these eight displacement vectors. However, in other embodiments, other direction independent GLCMs may be used, e.g., averaging different numbers and/or orientations of displacement vectors FIG. 10—Haralick Features As described above with respect to FIG. 5, second-order statistical features may be particularly discriminative in analyzing textured surfaces. Although any number and type of second order statistical features may be extracted for a given image (or partition), the second-order statistical attributes known in the art as Haralick features may be suitable to defect detection in images of textured surfaces. These features, known as entropy, dissimilarity, contrast, homogeneity, and correlation, may be defined as follows:

$$\text{Entropy} = \sum_{i=1}^{G}\sum_{j=1}^{G} P_{i,j}(-\ln P_{i,j}) \quad (4)$$

$$\text{Dissimilarity} = \sum_{i=1}^{G}\sum_{j=1}^{G} P_{i,j}|i-j|^2 \quad (5)$$

$$\text{Contrast} = \sum_{i=1}^{G}\sum_{j=1}^{G} P_{i,j}(i-j)^2 \quad (6)$$

$$\text{Homogeneity} = \sum_{i=1}^{G}\sum_{j=1}^{G} \frac{P_{i,j}}{1+(i-j)^2} \quad (7)$$

$$\text{Correlation} = \sum_{i=1}^{G}\sum_{j=1}^{G} P_{i,j}\left[\frac{(i-\mu_i)(j-\mu_j)}{\sqrt{\sigma_i^2 \sigma_j^2}}\right] \quad (8)$$

where $\mu_i = \sum_{i,i=1}^{G} iP_{i,j}$ and $\mu_j = \sum_{j,i=1}^{G} jP_{i,j}$ are the GLCM means; likewise $\sigma_i^2 = \sum_{i,i=1}^{G} P_{i,j}(i-\mu_i)^2$ and $\sigma_j^2 = \sum_{i,j=1}^{G} P_{i,j}(j-\mu_j)^2$ are the GLCM variances.

Figure 10:
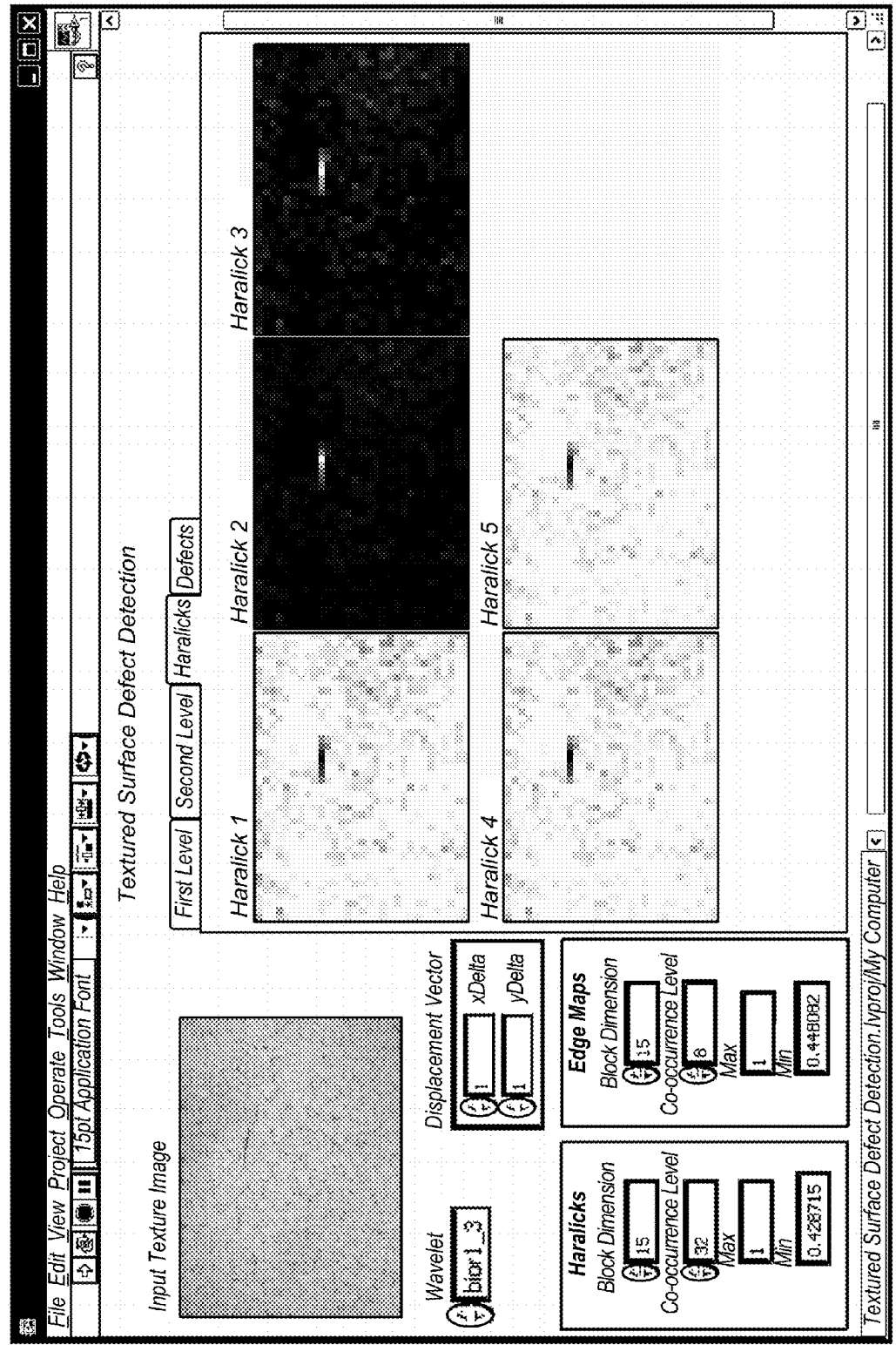
FIG. 10 illustrates several Haralick feature maps extracted from a subband of an exemplary textured image.

FIG. 10 illustrates feature maps for each of the Haralick features defined above for an input image of a textured surface. The input image is shown on the left. The Haralick features shown in FIG. 10 were extracted from the subband H shown in FIG. 7. In FIG. 10, the image labeled "Haralick 1" refers to entropy, the image labeled "Haralick 2" refers to dissimilarity, the image labeled "Haralick 3" refers to contrast, the image labeled "Haralick 4" refers to homogeneity, and the image labeled "Haralick 5" refers to correlation.

FIG. 11—Support Vector Machines

Figure 11A:
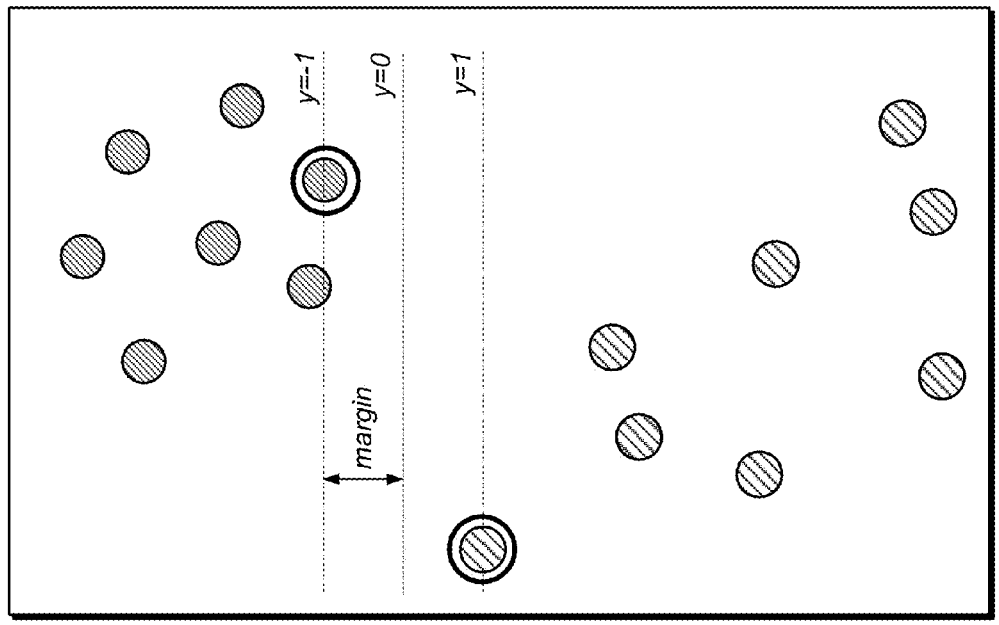
FIG. 11 illustrates two possible linear classifiers and corresponding margins and support vectors.
Figure 11B:
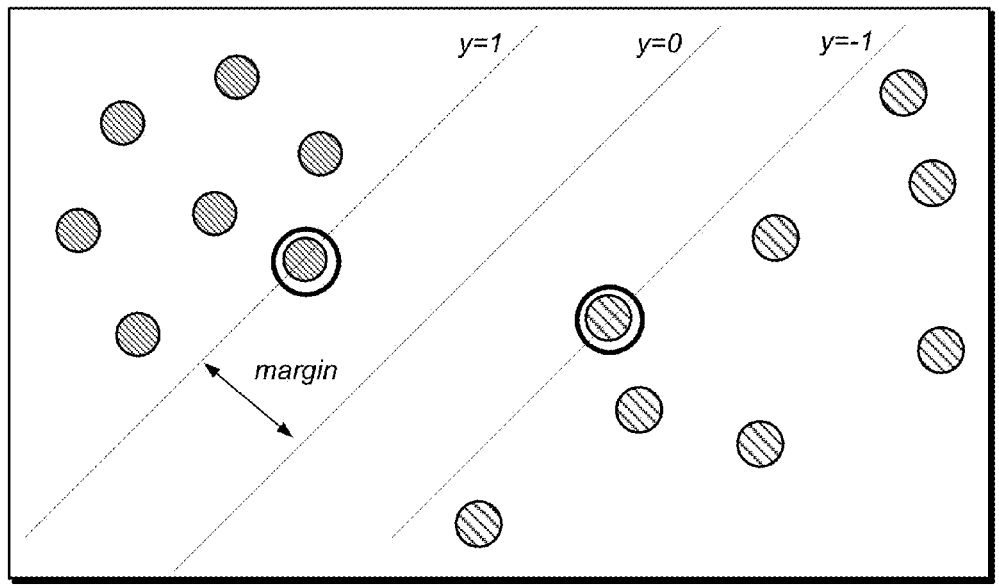
Figure 12A:
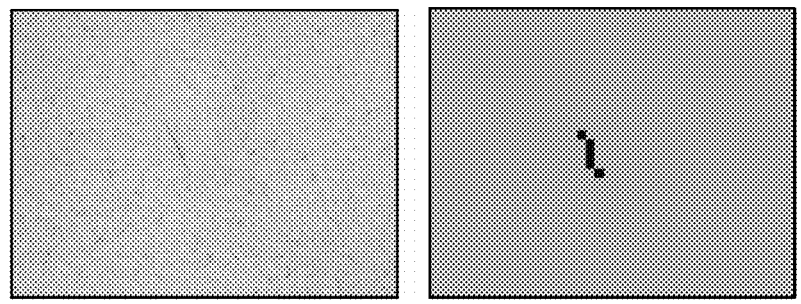
FIGS. 12A-12D illustrate several input images and corresponding decision maps generated according to one embodiment.
Figure 12B:
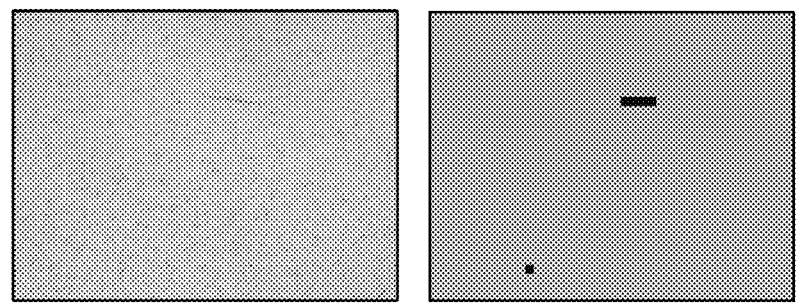
Figure 12C:
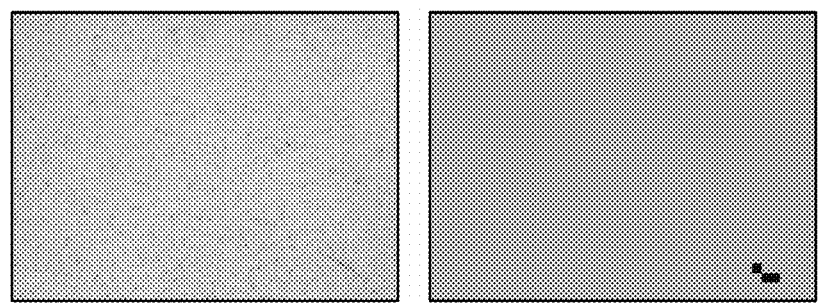
Figure 12D:
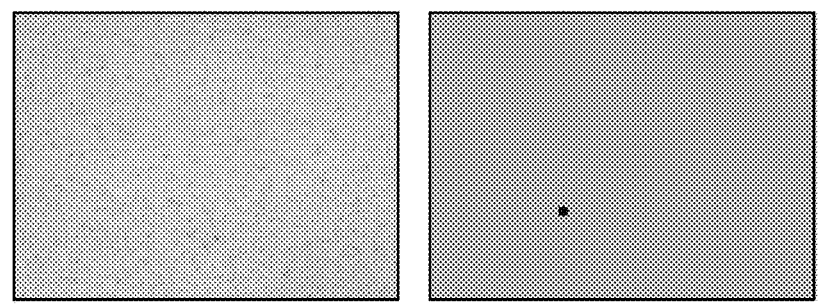

Support Vector Machines (SVMs) are typically used as two-class maximum margin classifiers; in this capacity they typically perform well in high dimensional features spaces, avoid over fitting, and have very good generalization capability. In general, an SVM will classify samples of two classes by finding a separating surface that has the maximum distance to the nearest data points on either side. These closest data points are called "support vectors" and the distance separating the separating surface to each nearest sample is called the "margin". FIGS. 11A and 11B show an example of a linearly separable scenario in 2-D space where class membership of data points $x_1, x_2, \ldots x_N$ is presented by target variable $t_n \in \{-1,1\}$. Two candidate linear classifiers are shown in FIGS. 11A and 11B respectively. The separating surfaces are represented by the dotted lines, while the margins and support vectors are also shown. As can be seen, the classifier in FIG. 11A has a smaller margin than the classifier in FIG. 11B; the classifier on the right is the maximum margin linear classifier in this example.

Generally, a linear classifier in a p dimensional feature space is a p−1 dimensional hyperplane $w^T \cdot x + b = 0$ where w is the normal vector and $$\frac{b}{\|w\|}$$

is the offset from the origin. The margin of each candidate classifier can be visualized by moving two parallel hyperplanes (e.g., the dashed lines in FIGS. 11A and 11B) in opposite directions until they reach the closest data points. The hyperplanes passing through the support vectors can be described in their canonical form after making isometric rescalings $w \rightarrow kw$ and $b \rightarrow kb$ by the equations:

$$w^T \cdot x + b = 1$$

$$w^T \cdot x + b = -1 \qquad (9)$$

Thus, using simple geometry, the margin is simply $$\frac{2}{\|w\|}.$$

Hence, in the separable case, the goal is to minimize $\|w\|$ such that no data point is located between hyperplanes. This may be written as:

$$t_n(w^T \cdot x_n + b) \geq 1 \text{ for all } 1 \leq n \leq N \qquad (10)$$

This optimization problem is a quadratic programming problem and the optimum normal vector $w$ is shown to have the form:

$$w = \sum_n \alpha_n t_n x_n \qquad (11)$$

where the coefficients $\alpha_n$ are the solutions of the quadratic programming problem. In this linearly separable case, new data points $x$ may then simply be classified based on the sign of the equation:

$$y(x) = w^T \cdot x + b = \left(\sum_n \alpha_n t_n x_n\right)^T \cdot x + b \qquad (12)$$

On the other hand, if the data points (samples) in the training data set are not linearly separable, the constraint (10) is not always satisfied. In such a case, one solution is to introduce non-negative slack variables $\xi_n$s that result in so-called "soft margin" linear support vector machines. The goal is to find $w \in \mathbb{R}^p$, $b \in \mathbb{R}$, and $\xi_n$s which minimize $(1/N)\Sigma_n \xi_n + \lambda \|w\|^2$ under the constraints:

$$t_n(w^T \cdot x_n + b) \geq 1 - \xi_n \text{ for all } 1 \leq n \leq N. \qquad (13)$$

$$\xi_n \geq 0, \forall n \qquad (14)$$

where $\lambda$ is a soft margin penalty parameter determined by the user.

The above concepts may also be extended to more complex non-linear decision boundaries. For example, a non-linear transformation may be used to map data points into a higher dimensional space. A linear classifier may subsequently be used to classify data points that are separable by a hyperplane in the new feature space. Thus, in this case, the decision boundary in the original space may be non-linear.

The above discussion relates generally to two-class SVMs, however, as previously mentioned, a one-class SVM may be more suitable to the problem of defect detection. In contrast to two-class SVMs, which determine a decision surface between two classes of samples, a one-class SVM may operate by finding a decision surface which encloses a majority of a single class. For example, a one-class SVM may determine a minimum volume which encloses a majority of the single sample class which is clustered in feature space. A certain fraction, $v$, of training samples from the single class may be allowed to lie outside the decision boundary. This anticipated training error leaves room for the possible presence of outliers in the training set, and helps minimize the volume enclosed by the decision surface. Thus, a one-class SVM may be formulated as the optimal hyperplane that separates a desired fraction $1-v$ of the training samples from the origin of the feature space:

$$\min_{w, \xi_n, b} \left(\frac{1}{2}\|w\|^2 - b + \frac{1}{vN}\sum_n \xi_n\right) \qquad (15)$$

subject to:

$$w^T \cdot x_n \geq b - \xi_n, \xi_n \geq 0, \forall n = 1, \ldots, N \qquad (16)$$

where $v$ is the fraction of training samples that are allowed to lie outside of the decision surface and $N$ is the total number of training samples. For example, in one embodiment, the rejection parameter $v$ may be selected such that 99% of the partitions present in the defect free training image are correctly classified as "normal" during a cross-validation. Additionally, in a preferred embodiment, a Gaussian kernel such as $$K(x_i, x_j) = \exp\left(-\frac{\|x_i - x_j\|^2}{2\sigma^2}\right)$$

may be used to transform input data points to a higher dimensional feature space. As noted above, such a transformation may facilitate the design of elegant non-linear classifiers in the original feature space by using linear classifiers in the higher dimensional space.

As described above with respect to FIG. 5, such a one-class SVM, having been trained only using defect-free images, may be utilized to classify an image or image partition as either normal or defective in the method shown in and described with respect to FIG. 5.

FIGS. 12A-12D—Decision Maps

FIGS. 12A-12D illustrate several input images and corresponding decision maps generated according to one embodiment. In each of the FIGS. 12A-12D, the images on the left are exemplary images of textured surfaces. The images in 12A, 12B, and 12C each have clearly visible defects, while the image in 12D does not appear to have a defect. The images on the right of FIGS. 12A-12D are decision maps produced using an embodiment of the method described with respect to FIG. 5. In each decision map, the partitions classified as outliers are shown as black, while normal partitions are shown as grey. As can be seen, the algorithm correctly classified the defects in FIGS. 12A-12C. The algorithm identified two partitions (one in FIG. 12B and one in FIG. 12D) which do not appear to the human eye to have any defects.

Two typical performance parameters used to evaluate the performance of a visual inspection algorithm include the "false acceptance rate" (FAR) and the "false rejection rate" (FRR). The FAR is the ratio of defective partitions classified as normal to the total defective partitions, while the FRR is the ratio of normal partitions mistakenly classified as defective to the total number of normal partitions. A preliminary testing of one embodiment of the method indicates that an FRR of 0.06% together with a FAR of 12.5% is a reasonable result for that embodiment.

Preliminary testing further indicates that the embodiments of the algorithm may be implemented using a typical computer system with substantially real-time results. For example, in one embodiment, a 640×480 image may be visually inspected and classified in about 2 seconds by a computer system with a 1.81 GHz Dual Core Processor.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for detecting textural defects in an image, the method comprising:
   receiving the image, wherein the image comprises an irregular visual texture;
   decomposing the image into a plurality of subbands using wavelet frames;
   constructing a plurality of feature vectors for the image, wherein the plurality of feature vectors comprise at least one feature vector from each of the subbands;
   classifying the image based on the plurality of feature vectors for the image, wherein said classifying utilizes a one-class support vector machine (SVM), wherein said classifying determines if a textural defect is present in the image.

2. The method of claim 1,
   wherein the one-class SVM is trained using only defect-free images.

3. The method of claim 1, further comprising:
   partitioning the image into a plurality of partitions;
   wherein the plurality of feature vectors comprise a feature vector for each partition of the plurality of partitions.

4. The method of claim 3,
   wherein the plurality of partitions do not overlap one another.

5. The method of claim 3,
   wherein at least a subset of the plurality of partitions overlap one another.

6. The method of claim 3, further comprising:
   determining at least one grey-level co-occurrence matrix (GLCM) for each partition; and
   extracting a plurality of second-order statistical attributes for each GLCM;
   wherein the feature vector for each partition comprises the plurality of second order statistical attributes for each of the at least one GLCMs for the respective partition.

7. The method of claim 6,
   wherein each of the at least one GLCMs is direction independent.

8. The method of claim 1,
   wherein the wavelet frames are biorthogonal.

9. The method of claim 1,
   wherein each of the plurality of subbands corresponds to a different resolution and/or orientation.

10. The method of claim 1,
    wherein the image has a stochastic intensity distribution.

11. A computer readable memory medium comprising program instructions for detecting textural defects in an image, wherein the program instructions are executable to:
    receive the image, wherein the image comprises an irregular visual texture;
    decompose the image into a plurality of subbands using wavelet frames;
    construct a plurality of feature vectors for the image, wherein the plurality of feature vectors comprise at least one feature vector from each of the subbands;
    classify the image based on the plurality of feature vectors for the image, wherein said classifying utilizes a one-class support vector machine (SVM), wherein said classifying determines if a textural defect is present in the image.

12. The computer readable memory medium of claim 11,
    wherein the one-class SVM is trained using only defect-free images.

13. The computer readable memory medium of claim 11,
    wherein the program instructions are further executable to:
    partition the image into a plurality of partitions;
    wherein the plurality of feature vectors comprise a feature vector for each partition of the plurality of partitions.

14. The computer readable memory medium of claim 13,
    wherein the plurality of partitions do not overlap one another.

15. The computer readable memory medium of claim 13,
    wherein at least a subset of the plurality of partitions overlap one another.

16. The computer readable memory medium of claim 13,
    wherein the program instructions are further executable to:
    determine at least one grey-level co-occurrence matrix (GLCM) for each partition; and
    extract a plurality of second-order statistical attributes for each GLCM;
    wherein the feature vector for each partition comprises the plurality of second order statistical attributes for each of the at least one GLCMs for the respective partition.

17. The computer readable memory medium of claim 16,
    wherein each of the at least one GLCMs is direction independent.

18. The computer readable memory medium of claim 11,
    wherein the wavelets frames are biorthogonal.

19. The computer readable memory medium of claim 11,
    wherein each of the plurality of subbands corresponds to a different resolution and/or orientation.

20. The computer readable memory medium of claim 11,
    wherein the image has a stochastic intensity distribution.

21. A visual inspection system for detecting textural defects in an image, comprising:
    an input for receiving images;
    a processor coupled to the input for receiving images;
    a memory medium coupled to the processor, wherein the memory medium comprises program instructions executable by the processor to:
    receive the image, wherein the image comprises an irregular visual texture;
    decompose the image into a plurality of subbands using wavelet frames;
    construct a plurality of feature vectors for the image, wherein the plurality of feature vectors comprise at least one feature vector from each of the subbands;
    classify the image based on the plurality of feature vectors for the image, wherein said classifying utilizes a one-class support vector machine (SVM), wherein said classifying determines if a textural defect is present in the image.

22. The visual inspection system of claim 21,
    wherein the one-class SVM is trained using only defect-free images.

23. A method for detecting textural defects in an image, the method comprising:
    receiving the image, wherein the image comprises an irregular visual texture;
    decomposing the image into a plurality of subbands, wherein said decomposing comprises utilizing biorthogonal wavelet frames, wherein each of the plurality of subbands corresponds to a different resolution and/or orientation;

partitioning the image into a plurality of partitions;
determining a plurality of grey-level co-occurrence matrices (GLCMs) for each partition, wherein each GLCM of a respective partition corresponds to a respective subband of the plurality of subbands;
extracting a plurality of second-order statistical attributes for each GLCM, wherein the plurality of second-order statistical attributes comprise entropy, dissimilarity, contrast, homogeneity, and correlation;
constructing a feature vector for each partition, wherein the feature vector for a respective partition comprises the plurality of second-order statistical attributes for each subband for the respective partition;
classifying each partition based on the feature vector of the respective partition, wherein said classifying utilizes a one-class support vector machine (SVM), wherein said classifying determines if a textural defect is present in the image.

24. The method of claim 23,
wherein the one-class SVM is trained using only defect-free samples.

25. The method of claim 23,
wherein said receiving, decomposing, partitioning, determining, extracting, constructing, and classifying are performed substantially in real-time.

26. The method of claim 23,
wherein if there is a textural defect present in the image, said classifying each partition determines a location of the textural defect.

* * * * *